US005351854A

United States Patent [19]

Hagopian

[11] Patent Number: 5,351,854

[45] Date of Patent: Oct. 4, 1994

[54] PACKAGE DISPENSING DEVICE

[75] Inventor: Gerald M. Hagopian, Oak Creek, Wis.

[73] Assignee: KCS Industries Inc., Milwaukee, Wis.

[21] Appl. No.: 76,581

[22] Filed: Jun. 14, 1993

[51] Int. Cl.[5] .............................................. B65G 59/00

[52] U.S. Cl. .................................... 221/107; 221/264; 221/276

[58] Field of Search ............... 221/103, 107, 108, 111, 221/264, 268, 270, 282, 276

[56] References Cited

U.S. PATENT DOCUMENTS

| | | | |
|---|---|---|---|
| 1,648,813 | 11/1927 | Kelly | 221/108 |
| 1,677,938 | 7/1928 | Van Sickle | 221/276 |
| 1,903,067 | 3/1933 | Richardson et al. | 221/107 |
| 1,912,999 | 6/1933 | Richardson et al. | 221/107 |
| 2,323,681 | 7/1943 | Sangster et al. | 221/276 |
| 2,546,986 | 4/1951 | Dressler | 221/111 |
| 2,613,122 | 10/1952 | Wells | 221/111 |
| 3,010,556 | 11/1961 | Wawronek et al. | 221/108 |
| 3,342,373 | 9/1967 | Weitzman | 221/107 |
| 4,401,235 | 8/1983 | Ratzker | 221/107 |
| 5,148,944 | 9/1992 | Kaufman et al. | 221/268 |

*Primary Examiner*—H. Grant Skaggs

*Attorney, Agent, or Firm*—Foley & Lardner

[57] ABSTRACT

An apparatus for dispensing uniformly sized packages is disclosed. The apparatus includes a storage portion having consecutive slots for storing uniformly sized packages vertically within each slot. The packages fall from the slots into a dispensing portion and they come to rest on a bottom support wall. A puller assembly slides along this bottom support wall to move the lowermost packages to the front of the apparatus where they may be selected individually by a user of the apparatus.

14 Claims, 5 Drawing Sheets

PACKAGE DISPENSING DEVICE

FIELD OF THE INVENTION

The present invention relates generally to devices for dispensing packages, and particularly to devices for displaying and dispensing individual packages, such as cigarette packs or the like which are to be purchased by a consumer.

BACKGROUND OF THE INVENTION

Convenience stores, gas stations, and many other types of stores display packages, such as cigarette packages, for purchase by consumers. Typically, such packages are either kept behind the counter area for access by the store clerk or displayed in racks providing access to the consumer.

If the packages are kept behind the counter, in overhead bins or containers for instance, it is difficult for the consumer to observe the selection carried by the store. Additionally, the clerk is forced to use excess time and motion in finding, selecting, and retrieving the particular package desired by the consumer.

On the other hand, if the packages are placed on racks accessible by the consumer, the store owner faces a greater risk of theft. For example, cigarette packs are typically placed on stands having open compartments for holding the different brands of cigarettes. It is relatively easy for a shoplifter to grab one or more of the cigarette packs and place them in a pocket or purse. As the cost of cigarettes continually escalates, store owners run a greater risk of excessive losses due to shoplifting.

Simply displaying the packages on a rack or in a case does not provide an adequate deterrent to theft of packages that are relatively small and expensive. It would be advantageous to have a dispensing device usable by consumers but providing limited access to the packages inside.

SUMMARY OF THE INVENTION

The present invention features an apparatus for dispensing uniformly sized packages. The apparatus includes a storage portion which has a first wall and a second wall disposed generally parallel to one another. The storage portion also includes dividers that extend at least partially between the first and second walls to divide the storage area into adjacent slots which can receive the packages in a vertically stacked arrangement.

The apparatus also includes a dispensing portion disposed beneath the storage portion. The dispensing portion includes a first guide wall generally aligned with the first wall of the storage portion and a second guide wall generally aligned with the second wall of the storage portion. A bottom wall extends between the first wall and second wall generally perpendicular to those walls. The bottom wall supports the lowermost packages after they slide down through the slots in the storage portion. Additionally, the dispensing portion includes a stop member extending from at least one of the first and second guide walls to prevent the removal of more than one package at a time from the apparatus.

A puller assembly is slidably mounted between the first and second guide walls and includes a handle portion which can be pulled forward. As the handle is pulled forward, the puller assembly moves the lowermost packages towards the stop member until one package falls from the dispensing portion.

BRIEF DESCRIPTION OF THE DRAWINGS

The invention will hereafter be described with reference to the accompanying drawings, wherein like referenced numerals denote like elements, and.

DETAILED DESCRIPTION OF THE PREFERRED EMBODIMENT

Figure 1:
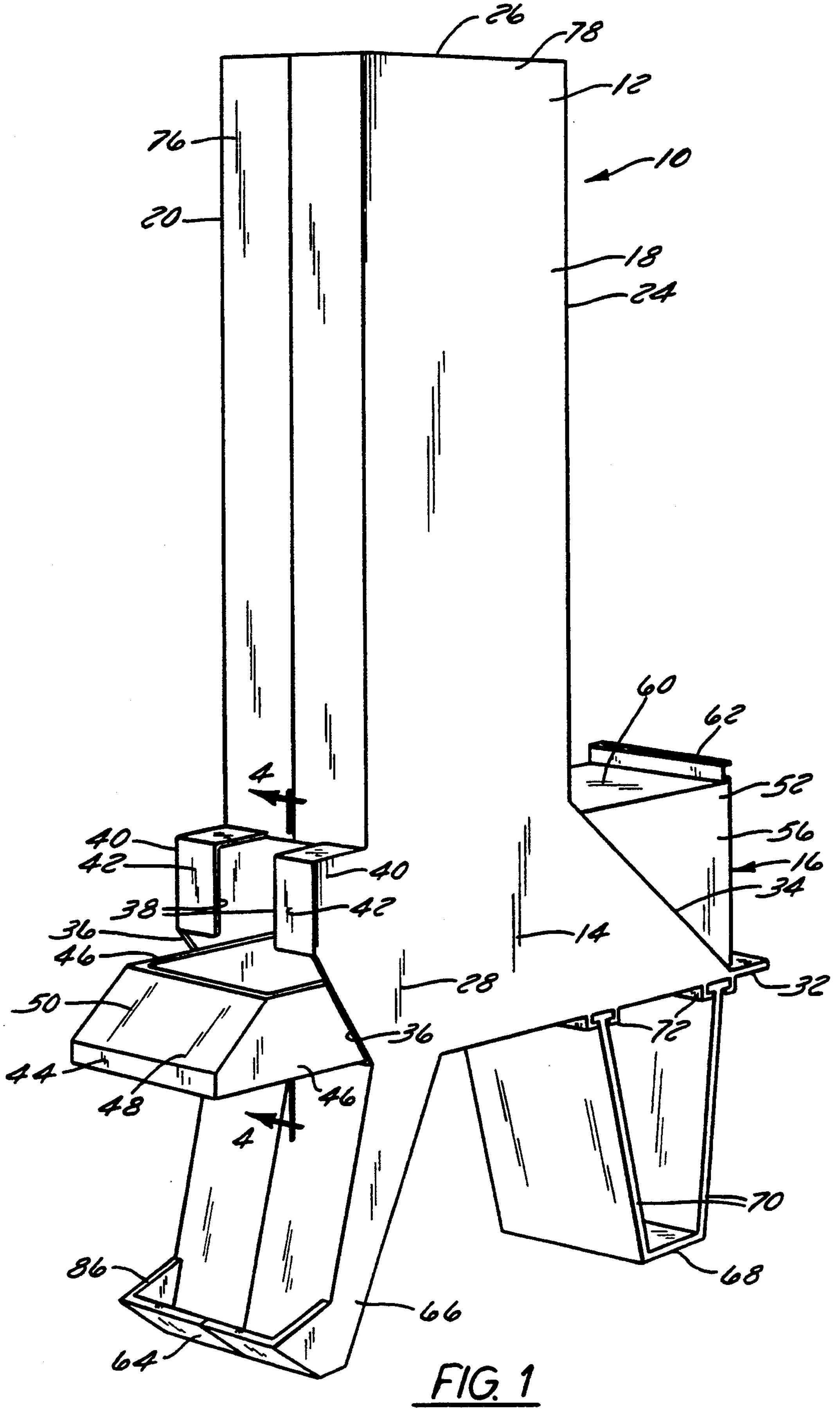
FIG. 1 is a perspective illustration of a package dispensing device according to a preferred form of the present invention.

Referring generally to FIG. 1, a package dispensing apparatus 10 according to the present invention is configured for holding a number of uniformly sized packages. For example, apparatus 10 may be used to dispense cigarette packs. Apparatus 10 includes a storage portion 12, a dispensing portion 14, and a puller assembly 16. Storage portion 12 is designed to hold a supply of the packages being dispensed, preferably in a vertically stacked arrangement. Dispensing portion 14 is disposed beneath storage portion 12 and is configured to receive the lowermost packages that are placed in storage portion 12. Puller assembly 16 is moved through dispensing portion 14 to urge the lowermost packages towards the front of apparatus 10 until, preferably, a single package is dispensed.

Storage portion 12 includes a first wall 18 and a second wall 20 spaced from one another and generally parallel to one another. Storage portion 12 also preferably includes a front wall 22 and a back wall 24, each disposed generally perpendicular between first wall 18 and second wall 20. Thus, walls 18, 20, 22, and 24 enclose a storage area 26 configured to receive the packages.

Dispensing portion 14 is disposed beneath storage portion 12 and includes a first guide wall 28 and a second guide wall 30 disposed generally parallel with first guide wall 28. Dispensing portion 14 also includes a bottom wall 32 extending between first guide wall 28 and second guide wall 30 generally perpendicular to each of these guide walls. Preferably, first guide wall 28 is generally aligned with first wall 18 of storage portion 12 and second guide wall 30 is generally aligned with second wall 20 of storage portion 12. Packages stacked in storage portion 12 may thus slide downward into dispensing portion 14 until they come to rest on bottom wall 32.

First guide wall 28 and second guide wall 30 each include a back edge 34 and a front edge 36. Extending outwardly from front edges 36 is a stop member 38 configured to allow forward movement of the lowermost packages in dispensing portion 14 over a predetermined distance when puller assembly 16 is pulled forward. Stop member 38 preferably includes a pair of walls 40 extending from front edges 36 and a pair of flanges 42, generally perpendicular to walls 40. Flanges 42 are attached to walls 40 at a slightly greater distance from front edges 36 than the thickness of the package being dispensed.

In the preferred embodiment, puller assembly 16 is slidably mounted on bottom wall 32 between first guide wall 28 and second guide wall 30. Puller assembly 16 includes a handle portion 44 extending outwardly from front edges 36. Handle portion 44 includes a spaced pair of side walls 46 which slide generally along first guide wall 28 and second guide wall 30, respectively. Side walls 46 are connected by a front gripping portion 48 which preferably includes a tapered wall 50. Side walls 46 are spaced at a sufficient distance to allow the packages in storage portion 12 to fall therebetween and to come in contact with bottom wall 32.

Puller assembly 16 also includes a ram portion 52 connected to side walls 46 opposite front gripping portion 48. Ram portion 52 is configured to move the packages resting on bottom wall 32 forward when front gripping portion 48 is pulled forward. Ram 52 preferably extends above side walls 46 and includes a front wall 54 extending between walls 46 and configured to contact and push the packages in dispensing portion 14 forward when puller assembly 16 is moved forward (see FIG. 4A). Ram 52 may also include a pair of ram side walls 56 for movement along first guide wall 28 and second guide wall 30, a ram bottom wall 58, a ram top wall 60, and a stop flange 62 extending upward from ram top wall 60 and configured for contact with back wall 24 of storage portion 12 if puller assembly 16 is moved too far forward. Preferably, bottom wall 32 extends outwardly from back edges 34 to provide additional support for puller assembly 16 as it is moved forward and backward through dispensing portion 14.

Optionally, apparatus 10 includes a receptacle 64 for receiving the packages which fall from dispensing portion 14. Preferably, receptacle 64 is combined with a front support 66 extending downwardly from bottom wall 32. Apparatus 10 may also include a back support 68 which is preferably a generally U-shaped member having a pair of upwardly extending legs 70 which are received in a pair of brackets 72 mounted on bottom wall 32.

Figure 2:
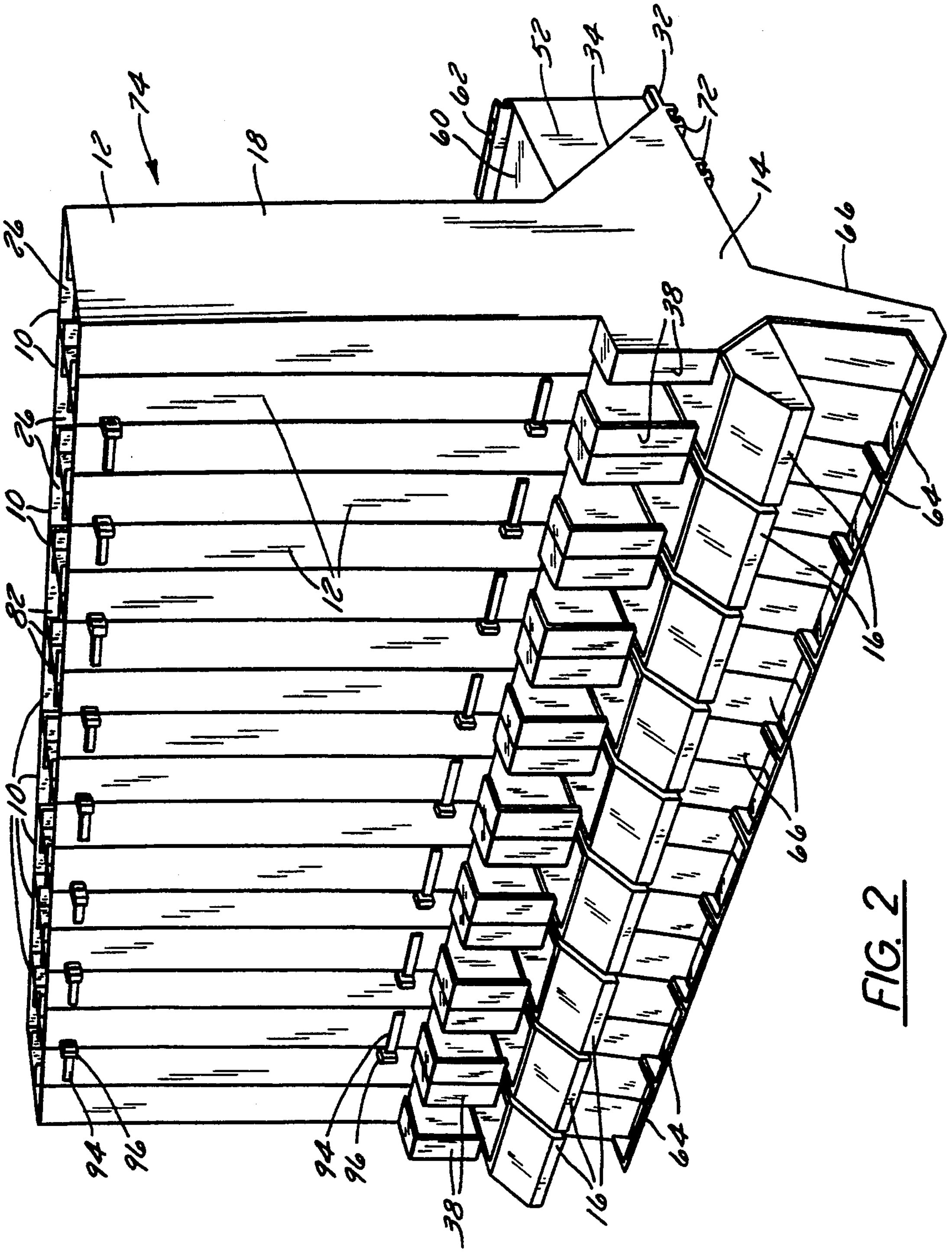
FIG. 2 is a perspective view of a plurality of package dispensing devices connected together to form an overall assembly.

As illustrated generally in FIG. 2, package dispensing device 10 may be configured for attachment to additional adjacent package dispensing devices 10. By combining a series of dispensing devices 10, an overall assembly 74 is formed for dispensing a variety of different packages. For example, the assembly 74 illustrated in FIG. 2 includes nine package dispensing devices 10 which can be used to dispense nine different brands of cigarette packs. The individual dispensing devices 10 can be combined adjacent one another in a variety of ways. For example, fasteners such as adhesive, bolts, screws, or interlocking fasteners formed in each dispensing apparatus 10 can be used.

Figure 3B:
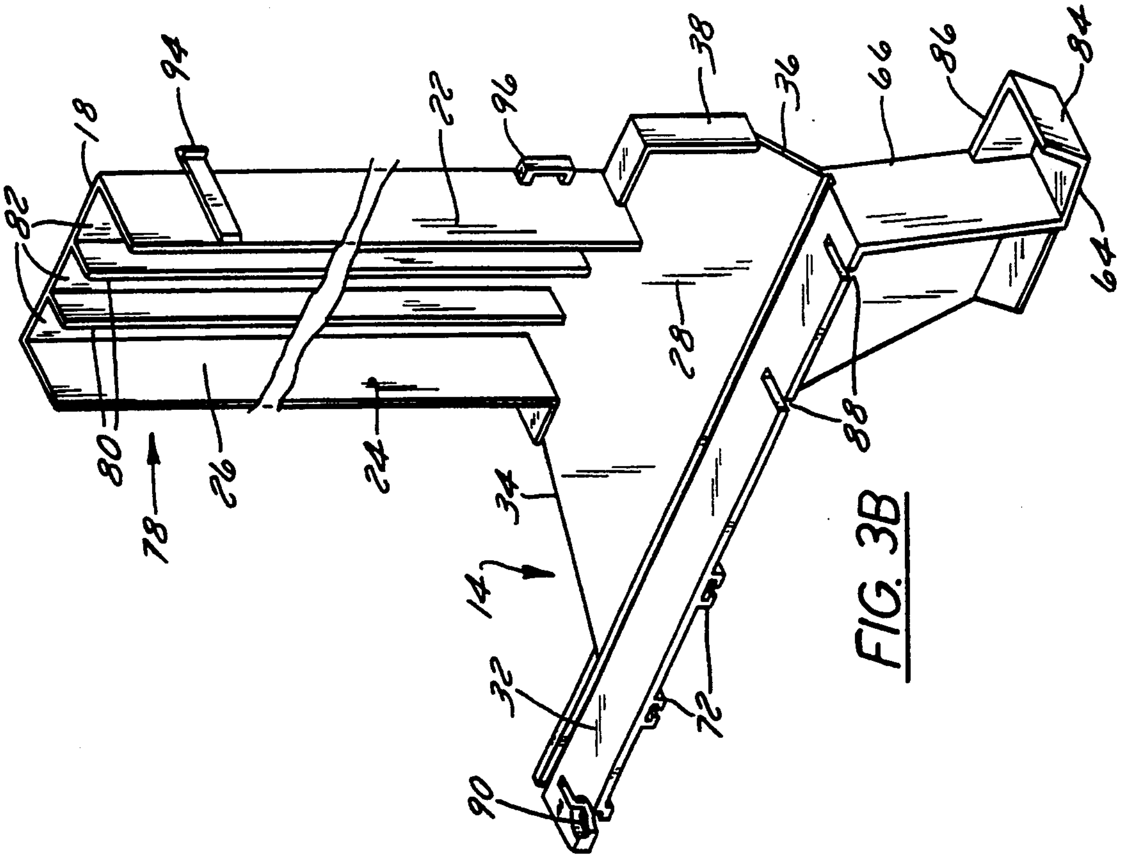
FIG. 3B is a perspective view of the right side of a package dispensing device according to the invention showing the interior of the device.
Figure 3A:
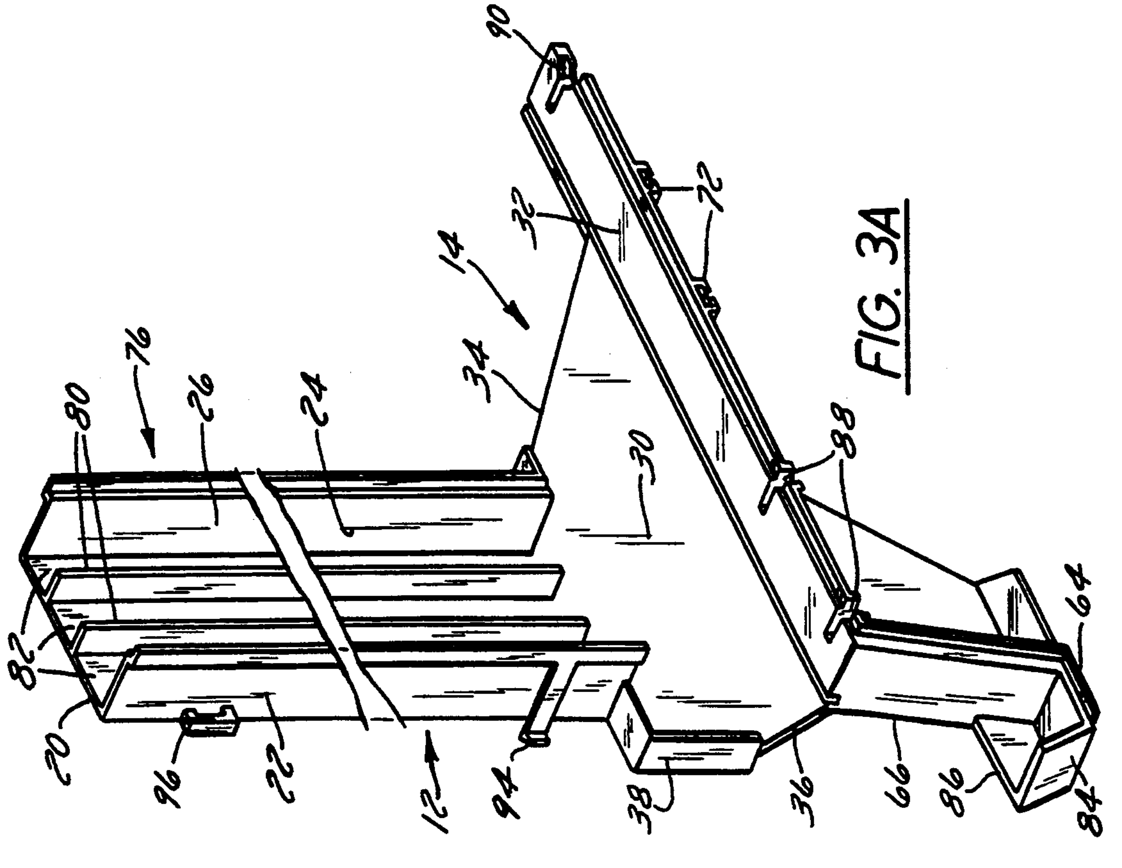
FIG. 3A is a perspective view of the left side of a package dispensing device according to the invention showing the interior of the device.

Referring now generally to FIGS. 3A and 3B, package dispensing apparatus 10 is shown split into two component halves. The preferred way of constructing apparatus 10 is to mold storage portion 12 and dispensing portion 14 in two components. A first component 76 is illustrated in FIG. 3A and generally forms the left side of storage portion 12, dispensing portion 14, and front support 66. A second component 78 is illustrated in FIG. 3B and generally forms the right side of storage portion 12, dispensing portion 14, and front support 66. First component 76 and second component 78 are then affixed together to integrally form storage portion 12 and dispensing portion 14. Of course, storage portion 12 and dispensing portion 14 could be made as separate components and later attached to one another.

As further illustrated in FIGS. 3A and 3B, storage portion 12 includes a plurality of dividers 80 which extend from first wall 18 and second wall 20. Although dividers 80 could span the entire distance between first wall 18 and second wall 20, it is preferred that they extend only part way between walls 18 and 20. Dividers 18 are appropriately positioned to form a plurality of slots 82 for receiving packages. Slots 82 are appropriately sized so that the packages will be held in a vertically stacked arrangement in each slot 82 (see FIGS. 4A–4D). In the most preferred embodiment, storage portion 12 has three slots which extend upward a sufficient distance to hold four packages in each slot between bottom wall 32 and the top of storage portion 12. However, the length, size, and number of slots 82 may be varied according to the particular application.

An alternate embodiment of receptacle 64 is also shown in FIGS. 3A and 3B. The alternate embodiment includes an outer upturned lip 84 to help retain the packages that fall from dispensing portion 14. Additionally, the alternate receptacle 64 includes outside retaining walls 86 disposed generally transverse to lip 84 and front support 66 to prevent the packages from falling sideways out of receptacle 64.

Other features more clearly illustrated in FIGS. 3A and 3B include a plurality of apertures 88 for receiving a platform (not shown) which can be added to adjust the size of the space for receiving packages beneath storage portion 12. Also, a spring retainer 90 is disposed in bottom wall 32 to secure a spring 92 (see FIGS. 4A–4D) which is preferably connected between spring retainer 90 and puller assembly 16 to automatically retract puller assembly 16 to its "at rest" position after it has been pulled forward by a user. The dispensing apparatus 10 can be used without a spring or with other types of retraction devices, but it is preferred that a constant force coil spring is connected between ram 52 and the spring retainer 90. FIGS. 3A and 3B also illustrate the preferred locking mechanism which is used to lock one dispensing apparatus 10 to another. The locking mechanism includes a clip 94 and a clip receiver 96 mounted to each side of storage portion 12. Thus, when one dispensing apparatus 10 is positioned next to an adjacent dispensing apparatus 10 the clips 94 and clip receivers 96 may be pressed together until they interlock and hold the adjacent dispensing devices in proximity to one another.

Figure 4A:
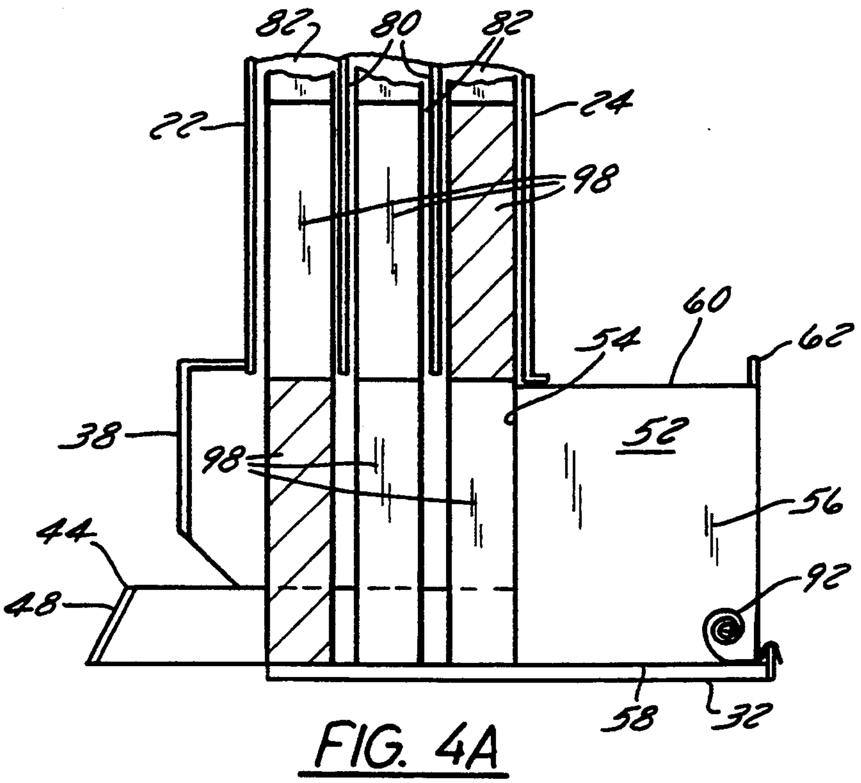
FIGS. 4A–4D are partial cross-sectional views of the apparatus taken generally along line 4—4 of FIG. 1 showing the package dispensing device in various modes of operation.

The operation of package dispensing apparatus can best be explained with reference to FIGS. 4A–4D. As illustrated in FIG. 4A, a plurality of packages 98 are positioned on top of one another in each slot 82. Thus, columns of vertically stacked packages are positioned in close proximity to one another in storage portion 12 with the lowermost package of each vertically stacked column coming to rest against bottom wall 32 in dispensing portion 14. In the particular example illustrated in FIG. 4A, there are three columns of vertically stacked packages with three lowermost packages resting in close proximity to one another along bottom wall 32.

Figure 4B:
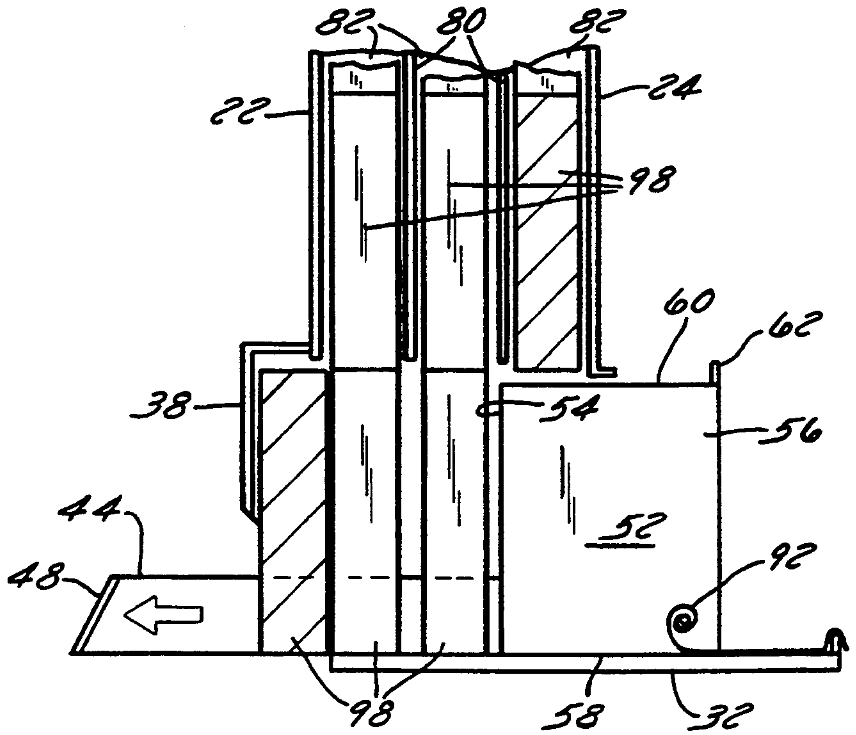

As illustrated in FIG. 4B, when puller assembly 16 is moved forward, ram 52 contacts the rearward lowermost package and moves it forward against the middle package which, in turn, is moved against the front lowermost package and then all three packages are moved forward until the front lowermost package comes to rest against stop member 38. When puller assembly 16 is released, spring 92 retracts it and allows the front lowermost package to fall from dispensing portion 14 into receptacle 64 where it may be retrieved by the consumer.

Figure 4C:
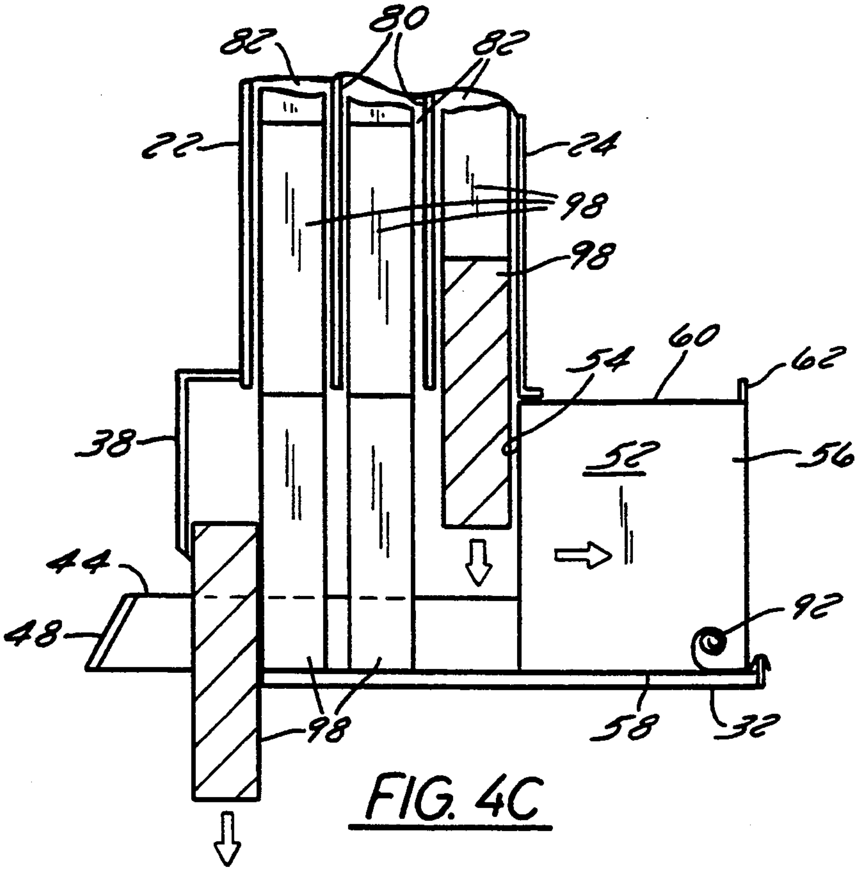
Figure 4D:
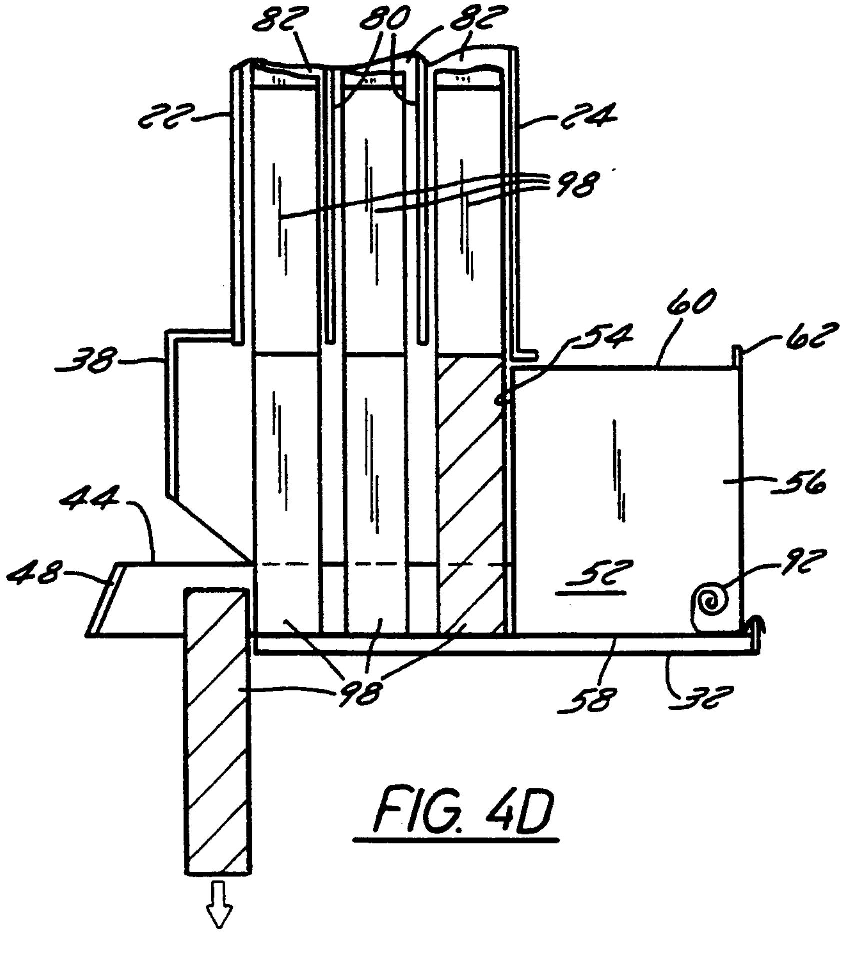

As illustrated in FIG. 4C, when puller assembly 16 is retracted to its original "at rest" position, the vertical column of packages 98 in the rearmost slot 82 moves vertically downward until it comes to rest against bottom wall 32, again providing three lowermost packages. Once puller assembly 16 is retracted and the dispensed package falls into receptacle 64, the process is ready to be repeated as shown generally in FIG. 4D.

In this example, used to illustrate the operation of apparatus 10, it is assumed that dispensing apparatus 10 includes three slots 82 and that four packages 98 are vertically stacked along each slot 82. After each operation of puller assembly 16, the front lowermost package 98 will be moved forward until it drops from dispensing portion 14. Following four operations of puller assembly 16, the rear slot 82 will be emptied. At this point, there will only be two lowermost packages, but the operation of dispensing apparatus 10 will remain the same. Forward movement of puller assembly 16 will move ram 52 against the rear lowermost package and drive that package forward until it pushes the front lowermost package against stop member 38 or until the front lowermost package falls from dispensing portion 14. After three additional operations of puller assembly 16, the second column of vertically stacked packages is emptied and only four vertically stacked packages remain in front slot 82. At this point, the operation of dispensing apparatus 10 still remains the same. Puller assembly 16 is moved forward until ram 52 contacts the front lowermost package and pushes it against stop member 38. When puller assembly 16 is released that package is released into receptacle 64 and the remaining vertically stacked packages in front slot 82 move downward until the new lowermost package 98 contacts bottom wall 32. Following three more operations of puller assembly 16, dispensing apparatus 10 is emptied and refilling is required.

To refill apparatus 10, puller assembly 16 is permitted to be retracted to its at rest position by spring 92. Then, new packages are inserted into slots 82 through the top of storage portion 12 until package dispensing apparatus 10 is once again filled.

The configuration and operation of package dispensing apparatus 10 prohibits a consumer from gaining easy access to all of the packages. Typically, the consumer will only be able to obtain one package at a time and that will require operation of puller assembly 16. The configuration of stop 38 and front gripping portion 48 of puller assembly 16 makes it difficult for the consumer to gain access to the packages in storage portion 12 or dispensing portion 14 by any other method.

It will be understood that the foregoing description is of a preferred exemplary embodiment of this invention and that the invention is not limited to the specific forms shown. For example, the apparatus may be made from separate or integral components, the apparatus may be made out of a variety of plastics or other durable materials, the number and height of the package receiving slots may be changed according to the specific application, and various legs, platforms, and other types of supports may be used to support the apparatus. These and other modifications may be made in the design and arrangement of the elements without departing from the scope of the invention as expressed in the appended claims.

What is claimed is:

1. An apparatus for dispensing uniformly sized packages, the apparatus comprising:

a storage portion including a first wall and a second wall disposed generally parallel to ne another, said storage portion further including dividers extending at least partially between said first wall and said second wall to divide said storage area into adjacent slots, each slot being configured to receive the packages in a vertically stacked arrangement;

a dispensing portion disposed beneath the storage portion, the dispensing portion including a first guide wall generally aligned with the first wall of the storage portion, a second guide wall generally aligned with the second wall of the storage portion, a bottom wall extending between the first guide wall and the second guide wall generally perpendicular to the first and second guide walls, the dispensing portion further including a stop member extending from at least one of the first and second guide walls at least partially between the first and second guide members, wherein the packages slide downwards through the slots, the lowermost packages being supported by the bottom wall;

a puller assembly slidably mounted between the first guide wall and the second guide wall, the puller assembly including a ram portion constantly disposed above the bottom wall for contact with at least one of the lowermost packages and a handle portion connected to the ram portion, wherein upon moving the handle portion forward, the ram portion forces the lowermost packages forward until one package falls from the dispensing portion; and a support disposed beneath the dispensing portion, wherein the storage portion, the dispensing portion, and the support are formed in two integral pieces which are joined along a plane disposed generally parallel with the first and second guide walls.

2. The apparatus as recited in claim 1, further comprising a spring connected between the puller and the dispensing portion, wherein the spring retracts the puller after it has been moved forward and released.

3. The apparatus as recited in claim 2, further comprising a chute configured to catch and hold each package that drops from the dispensing portion.

4. The apparatus as recited in claim 3, further comprising a stand attached to the bottom of the dispensing portion.

5. The apparatus as recited in claim 2, wherein the first wall is integrally molded with the first guide wall and the second wall is integrally molded with the second guide wall.

6. An apparatus for dispensing packages, the apparatus comprising:

a storage portion having a front, a back, a pair of generally parallel external side walls, and at least one divider disposed between the side walls, the divider being configured to split the storage portion into consecutive slots from the back to the front, the slots receiving the packages in a vertically stacked arrangement within each slot;

a dispensing portion disposed beneath the storage portion, the dispensing portion having a bottom support wall oriented generally perpendicular to the slots for supporting the lowermost packages and a pair of generally parallel guide walls integrally formed with the external side walls of the storage portion, wherein the storage portion and dispensing portion are formed from two integral components, each component including at least part of the storage portion and the dispensing portion, the two components being joined along a seam extending generally transversely to the bottom support wall; and a puller assembly slidably mounted in the dispensing portion intermediate the storage portion and the bottom support wall, the puller assembly including a ram and a handle connected to the ram, the ram being configured to slide the lowermost packages forward along the bottom support wall when the handle is pulled.

7. The apparatus of claim 6, further comprising a stop member disposed to limit the forward travel of the puller assembly.

8. The apparatus of claim 7, wherein the puller assembly is spring loaded to automatically return the puller assembly to its original position after the handle is pulled and released.

9. The apparatus of claim 8, wherein the ram includes a generally horizontal top wall to prevent any additional packages from falling to the bottom support wall while the handle is being pulled forward.

10. The apparatus of claim 9, wherein the handle includes a pair of handle walls connected to the ram and appropriately spaced to allow the packages to rest on the bottom support wall intermediate the handle walls.

11. The apparatus of claim 8, further comprising a plurality of storage portions connected adjacent one another, a plurality of dispensing portions connected adjacent one another, and a plurality of puller assemblies, each puller assembly being slidably mounted in a corresponding dispensing portion.

12. An apparatus for dispensing packages, the apparatus comprising:

a storage portion having a front, a back, a pair of generally parallel external side walls, and at least one divider disposed between the side walls, the divider being configured to split the storage portion into consecutive slots from the back to the front, the slots receiving the packages in a vertically stacked arrangement within each slot;

a dispensing portion disposed beneath the storage portion, the dispensing portion having a dispensing portion front, a generally horizontal bottom support wall for supporting the lowermost packages, a first guide wall and a second guide wall, the first and second guide walls extending between the bottom support wall and the storage portion;

a puller assembly constantly disposed above the bottom support wall and intermediate the first and second guide walls for sliding movement beneath the slots, the puller assembly including a ram and a handle attached to the ram, the ram including a front wall for contacting the rear lowermost package and a top wall disposed to prevent additional packages from falling to the bottom support wall while the handle is being pulled to force the lowermost packages towards the dispensing portion front, the handle including a front gripping portion and a pair of handle walls connected between the front gripping portion and the ram, the handle walls being spaced to receive the packages therebetween as the packages fall to the lower support wall; and a support disposed beneath the dispensing portion to support the dispensing portion, the support including an integral receptacle for receiving the dispensed packages.

13. The apparatus of claim 12, wherein the puller assembly includes a stop flange which abuts the storage portion when the handle is pulled a sufficient distance.

14. The apparatus of claim 13, further comprising a package stop disposed at a spaced distance from the dispensing portion front, the stop being looted to permit only one package at a time to fall between the package stop and the dispensing portion front.

* * * * *